United States Patent [19]

Smith

[11] Patent Number: 4,720,216

[45] Date of Patent: Jan. 19, 1988

[54] CYLINDRICAL CUTTING TOOL

[76] Inventor: Robert S. Smith, 1263 Emory St., San Jose, Calif. 95126

[21] Appl. No.: 692,426

[22] Filed: Jan. 18, 1985

[51] Int. Cl.⁴ ............................................. B23B 39/00
[52] U.S. Cl. ..................... 407/113; 407/11; 407/114
[58] Field of Search ............... 407/103, 113, 115, 116, 407/11, 114

[56] References Cited

U.S. PATENT DOCUMENTS

| | | | |
|---|---|---|---|
| 160,161 | 2/1875 | Clay | 407/11 |
| 234,545 | 11/1880 | Dewey | 407/116 |
| 2,289,344 | 7/1942 | Cedarleaf | 407/103 |
| 2,370,273 | 2/1945 | Ulliman | 407/116 |
| 2,550,645 | 4/1951 | Retz | 407/11 |
| 4,621,955 | 11/1986 | Briese | 407/113 |

FOREIGN PATENT DOCUMENTS

| | | | |
|---|---|---|---|
| 28779 | 3/1977 | Japan | 407/114 |
| 607770 | 9/1948 | United Kingdom | 407/113 |
| 2057939 | 4/1981 | United Kingdom | 407/114 |

*Primary Examiner*—W. D. Bray

[57] ABSTRACT

An apparatus, operating automatically, for developing a very fine finish on a disk surface which includes a cylindrical toolbit whose cutting edge can be accurately and frequently or automatically rotated so that an unused length of edge can be presented to maintain sharpness and whose shape is amenable to cutting the disk surface on a first pass and burnishing on the staggered return pass and wherein lubricant is fed through a hole in the center of the toolbit to a point between the chip and toolbit surface for the purpose of developing the fine finish together with a turntable for automatically feeding disks to the toolbit to be machined and then withdrawing the disk and storing it.

2 Claims, 30 Drawing Figures

FIG. 27a $$\delta = \frac{P^2/4}{D}$$

FIG. 27b

FIG. 27c $$\delta' = \frac{P^2/16}{D} = \delta/4$$

FIG. 27d

CYLINDRICAL CUTTING TOOL

BACKGROUND OF THE INVENTION

1. Field of the Invention

This invention relates to the field of machining metal surfaces as is done with lathes or similar machines.

2. Description of the Prior Art

A well known method of shaping bars of metal, e.g., steel, aluminum, copper alloys, and ceramics and plastics is by lathe turning. The lathe consists of a rotating vice or chuck which grips the bar so that the bar rotates about its axis. A tool bit is mounted on a movable tool bit holder so that as the bar rotates, the toolbit bit moves tangential to and in contact with the surface of the bar. In this mode of use, the tool bit will travel parallel to the axis of the bar which is also the axis of rotation.

If the metal to be machined is a flat metal plate and it is desired to reduce the thickness of the plate, the chuck is replaced by a "face plate". The metal to be shaped is attached to the faceplate by bolts or vacuum means. The faceplate rotates about an axis perpendicular to its surface and the toolbit moves tangential to the surface of metal so as to reduce its thickness.

The process described above is used commonly as an early step in manufacturing a thin metal disk for use in magnetic recording. The purpose of this step is to remove a thin skin (about 0.005 inches thick) which removes surface imperfections and scale; to generate a surface that is flat and to provide a surface finish of 1 to 15 microinch arithmetic average roughness.

An important factor which determines the surface finish is the shape of the tool bit, i.e., the angle that is formed by the two sides of the cutting edge, and the orientation of the cutting edge in relation to the direction of motion of the machined surface. Another factor is the hardness of the tool bit and for this reason, materials are selected for tool bits which provide the greatest resistance to wear and breakage. As the cutting edge becomes dull, it is necessary to interrupt the machining operation to adjust the cutting edge to a new (unused) position and to eventually remove the tool bit and resharpen the cutting edge. The tool bit removes metal by a shearing action which results in a chip forming and sliding on the surface of the tool bit away from the point of cutting. Heat is generated by two factors. One is the work required to separate the chip from the base metal. The second source of heat is the rubbing of the chip against the surface of the tool bit, as it is forced away from the point of formation. The result is that the temperature of the tool bit rises. The hottest point on the tool bit is on the surface a short distance from the cutting edge—not at the edge per se. Pitting begins at this point and eventually leads to breakage, i.e., dulling of the tool bit.

Therefore, another factor that determines the finish of the machined surface is the lubricant that is applied during the cutting operation. The lubricant cools the tool bit and metal so as to relieve the thermal stress and promote nonadherent sliding of the chip. Not only is the composition of the lubrication important, but the method of application is also important. In fact the major problem with most lubrication systems is that the lubricant is not applied where it will do the most good.

In conventional lubrication, the tool bit is positioned between the chip and newly formed surface and the lubricant is applied on the side of the chip away from the tool bit and on the area of metal surface that has not yet been machined. It is not applied directly into the interface between tool bit and chip.

It is an objective of this invention to apply lubricant directly into the interface between toolbit and chip at the cutting edge.

As an early step in the preparation of substrates for magnetic recording according to present practice, the disk is machined with a carbide tool bit (tungsten carbide) shaped like the section of a cone (i.e., a conical section bounded by two flat surfaces). The disk is cut by the sharp edge formed by the flat surface and the conical surface. As the cutting edge becomes dull, the cone is rotated so as to present a sharp unused length of the cutting edge. The entire cutting edge may be resharpened by removing the tool bit and lapping the flat surface. If breakage or wear at the edge is excessive, the tool bit must be discarded.

In the manufacture of disks for magnetic recording, two competitive processes are used to provide the final finish. In one process, the disks are polished with polishing pads of the appropriate composition. In the second process, the surface is mahined using a diamond tool bit with a number of cutting edges (eight is typical). As the tool wears, the operator turns the tool bit so as to present an unused edge. The diamond machining technique removes about 0.002 inches from the disk surface.

There are two actions associated with the cutting mechanism of the diamond tool bit with regard to its ability to provide a fine finish. One is the shearing action performed by the leading length of edge as the tool bit plunges into the metal. The second is the burnishing action of the trailing edge as it passes over the newly formed metal surface. These two mechanisms will be considered subsequently in connection with the present invention.

Proponents of machining with diamond point out that diamond retains its sharp cutting edge longer than, e.g., carbide, so that precision cuts can be made leaving the surface free of stresses that are otherwise generated by a dull tool. Proponents of pad polishing argue that machining with diamond is slow and that diamond tool bits are expensive.

It is a further objective of this invention to provide a tool bit configuration that is amenable to the making of tool bits from a number of different materials so as to provide a tool bit that is almost as hard as diamond but the material is not so expensive.

It is a further objective of this invention to provide a tool bit configuration wherein the conduction of heat away from the cutting edge is improved by judicious selection of the tool bit material.

It is a still further objective of this invention to configure the tool bit and mount it in position on the tool bit holder so that the tool bit cutting edge may be changed very quickly by small increments and, if so desired, automatically between cuts so as to reduce markedly the time of interruption of production.

The machining of titanium presents a special problem because the tool bit wears very quickly. It is a further objective of this invention to provide a tool bit configuration wherein the cutting edge can be changed continually during the cutting process so that the cutting edge is sharp during an entire cut that is long and on materials that cause excessive wear of the tool bit.

It is yet another objective of this invention to provide a configuration of tool bit that is very amenable to resharpening and that can be resharpened many more times than is customary with conventional tool bits.

There are a number of reasons why it is desireable to reduce the amount of lubricant used in a machining operation.

Many lubricants are expensive—especially those that are not waterbased.

The disposal of lubricants is an expense especially when it is done in such a way so as to protect the environment.

Fumes of lubricants are unhealthy, especially for an operator standing over a lathe for many hours. The manner in which lubricants are applied according to present practice often causes a very smoky dense environment. Another objective of this invention is to reduce the amount of lubricant required in the machining operation which would alleviate these problems.

The tool bit configuration and lubrication technique can be used to machine various shapes such as cylinders, plates, etc., and present advantages obvious to those skilled in the art after studying the following descriptions and drawings.

According to present practice, disks for magnetic recording are first machined on a lathe, as described, and then transferred manually to a polishing machine that consists of a conveyor that transfers the disks from one polishing station to the next, in about six steps, so as to provide a finish that is about 0.5 microinch, arithmetic average. Because of the complexity required for an apparatus that would transfer a disk to a lathe, then from the lathe to a polishing machine, no such machine is reported to have been built or put into practice.

There have been built and in use, devices called "stackers" on wheels, that permit loading of discs, one at a time in one end so that the stack of discs can be rolled to a desired position and unloaded from the same end. The "stacker" is comprised of threaded rods, so that each disk is supported on one thread of each of the threaded rods. "Stackers" can be loaded and unloaded from the top only.

It is an object of this invention to provide an apparatus which incorporates the novel toolbit, machining and transfer configurations so as to succeed in automatically manufacturing discs with a very fine finish at a cost that is much lower than is presently achieved.

SUMMARY OF THE INVENTION

The tool bit of this invention is a rod whose cutting edge is formed by the intersection of the curved cylinder and the end of the cylinder. The end of the cylinder in most cases will be concave but in some cases may be flat or convex. The tool bit rod may consist of a central core of steel, aluminum, copper alloy or other appropriate material to provide heat conductivity and a layer on the outside of the rod of a suitable hard material such as carburized or case hard steel, flame sprayed or gaseous deposited ceramic, etc.

The rod is fixed in a tool holder so that the cutting edge contacts the metal surface and may be rotated slightly between cuts or during a cut either manually or automatically between cuts or during a cut to present a new cutting edge.

In one mode of lubrication, a hole down the center of the rod is provided through which lubricant can flow then directly out onto the concave surface of the tool bit (rod) from whence it is directed by a cap to the point of cutting under the chip. The cap helps to lift and separate the chip from the toolbit, i.e., acts as chip breaker.

In a second mode of lubrication, the tool bit need not have a hole nor need it be a rod however a cap fits over the cutting face of the tool bit, lifts the chip, and directs lubricant under the chip to the point of cutting. An apparatus for the automatic manufacture of disks with very flat and smooth surfaces incorporates the advantages of the toolbit and is comprised of a turntable which transfers the disk from a feeding station to a chuck where it is machined, burnished and polished; then it is transferred back to the turntable, thence to a washing station and finally to an unloading device.

BRIEF DESCRIPTION OF THE DRAWINGS

FIG. 9 shows these tool bits cutting metal.

FIG. 10 shows a method of directing lubricant under the chip according to the invention, using a channel to direct flow of the lubricant. Construction of the channel is illustrated in FIGS. 11, 12 and 13.

FIG. 14 shows a second means of directing lubricant flow in which lubricant flows through the hole in the tool bit.

DETAILED DESCRIPTION

Figure 1:
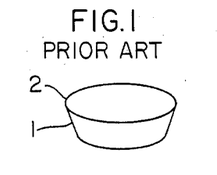
In FIG. 1 is shown a typical carbide tool bit.
Figure 2:
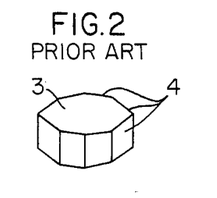
In FIG. 2 is shown a typical diamond tool bit.
Figures 3, 4, 5, 6, 7, 8:
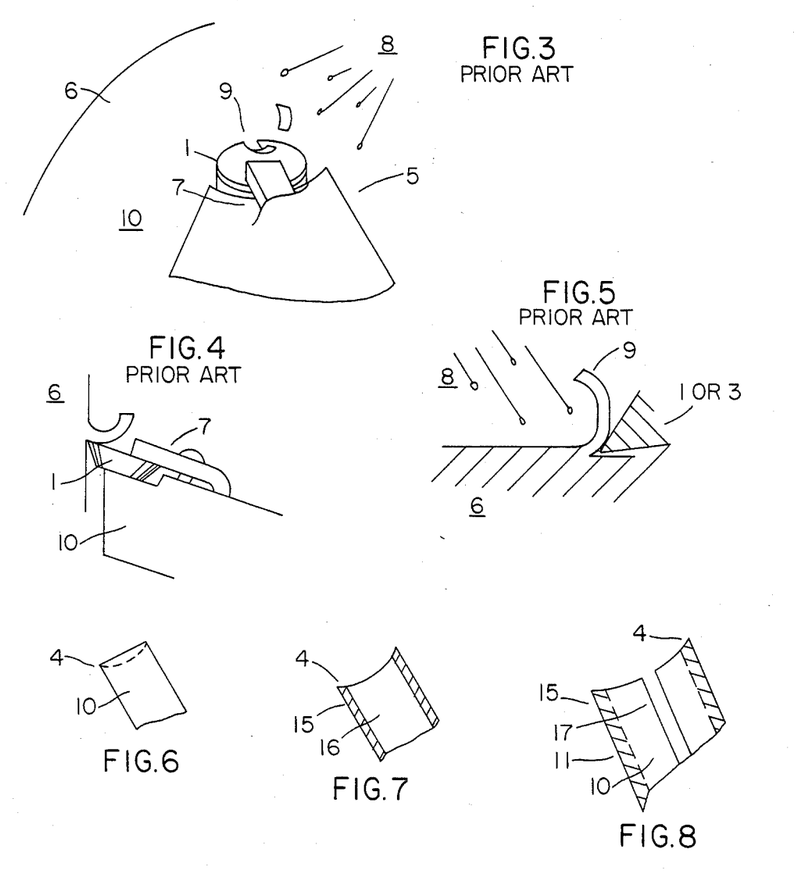
In FIGS. 3 and 4 are shown conventional mountings for the toolbits shown in FIGS. 1 and 2.
In FIG. 5 is shown in cross section a view of the metal being cut and chip formation using bits of FIGS. 1 and 2.
In FIGS. 6, 7 and 8 are shown tool bits of this invention.

Turning now to a more detailed description and discussion, of the preferred embodiments, there is shown in FIG. 1 a conventional tool bit (carbide), 1, such as used to machine a metal surface and obtain a smooth surface free of defects. The flat surface of the truncated cone is lapped to provide a sharp cutting edge, 2. The conical shape provides clearance as shown in FIG. 4. Similarly in FIG. 2 is shown a diamond tool bit with eight cutting edges, 4.

In FIGS. 3 and 4 are illustrated the manner in which the tool bit is clamped between members 7 and 10 of mount 5 and forced against metal surface 6 so as to cut the surface, 6, and generate chips 9. The surface is lubricated by spray, 8.

In FIG. 5 is shown tool bits 1 or 3 machining s surface 6. According to practice, lubricant 8 sprayed on the surface is not applied directly to the interface between chip and tool bit.

In FIG. 6 is shown one configuration of tool bit 10 according to the invention. The tool bit 10 is seen to be a cylindrical rod wherein the end of the rod is ground to a concave shape so as to provide a sharp cutting edge, 4. The manner in which the tool bit cuts is discussed subsequently in connection with FIG. 9.

In FIG. 7 is shown a second embodiment, a cylindrical tool bit in cross section wherein a coating of hard material, 15, is formed onto a central core, 16. Hard materials include metal carbides, ceramics, (usually metal oxides), and hard metal alloys which are defined for the purposes of this invention to be alloys containing Fe, Co, Cr, W, Ni, Vd and Mn. There are numerous ways in which the the hard coating or surface can be formed on the rod.

One method is to case harden a steel rod. According to this technique, the steel part is placed in a carburizing furnace, i.e., a furnace with a carbonaceous atmosphere such as natural gas and heated to above 1000° F. Carbon atoms will thereby diffuse into the steel surface to form a skin of iron carbide whose thickness depends on the time and temperature in the furnace.

A second method of coating would be by the deposition (i.e., vapor deposition) of one of a number of refractory coatings, for example, carbides of chromium, tungsten, boron. The techniques are described in numerous references, for example, *Vapor Plating* by C. F. Powell, I. E. Campbell, B. W. Gonser, sponsored by the Electrochemical Society, Inc., New York, N.Y. and published by the John Wiley and Sons, New York, N.Y.

A third method is to hard anodize an aluminum rod. The hard anodize is made more wear resistant by plating Ni onto the anodized surface. Anodizing is a well known process for developing a hard aluminum oxide surface on Aluminum. See for example, the *Metal Finishing Guidebook*, published annually by Metals and Plastics Publications, Inc., Westwood, N.J. Although aluminum oxide is an insulator, the anodized coating is porous so that various metals can be plated into the pores. (See *Method of Making a Magnetic Recording Disk*, U.S. Pat. No. 3,886,052.) Suitable metals for deposit into the pores would include Ni, Co, Cu, Pb, Sn, Cr, Fe. Choice of the metal would depend on the surface property desired. For example, lead would enhance lubricity, Cobalt would enhance hardness, copper would enhance ductility.

The anodized aluminum tool bit, especially in conjunction with the novel lubricating technique to be described is well adapted to machining materials such as plastics which are easily overheated by conventional machining techniques. Aluminum has a large coefficient of heat conductivity which would serve to prevent overheating of the plastic.

In addition to improved thermal conductivity offered by the plated core structure, another advantage is low cost, compared to present methods of tool bit manufacture, such as hot pressing carbides, etc.

FIG. 8 illustrates a configuration of tool bit, an embodiment of this invention, in which a hole, 17, passes through the center of the rod from one end to the other. The purpose of the hole is to provide an improved lubrication means as seen by comparing FIG. 9 to FIGS. 10 and 14.

Figures 9, 10, 11, 12, 13, 14:
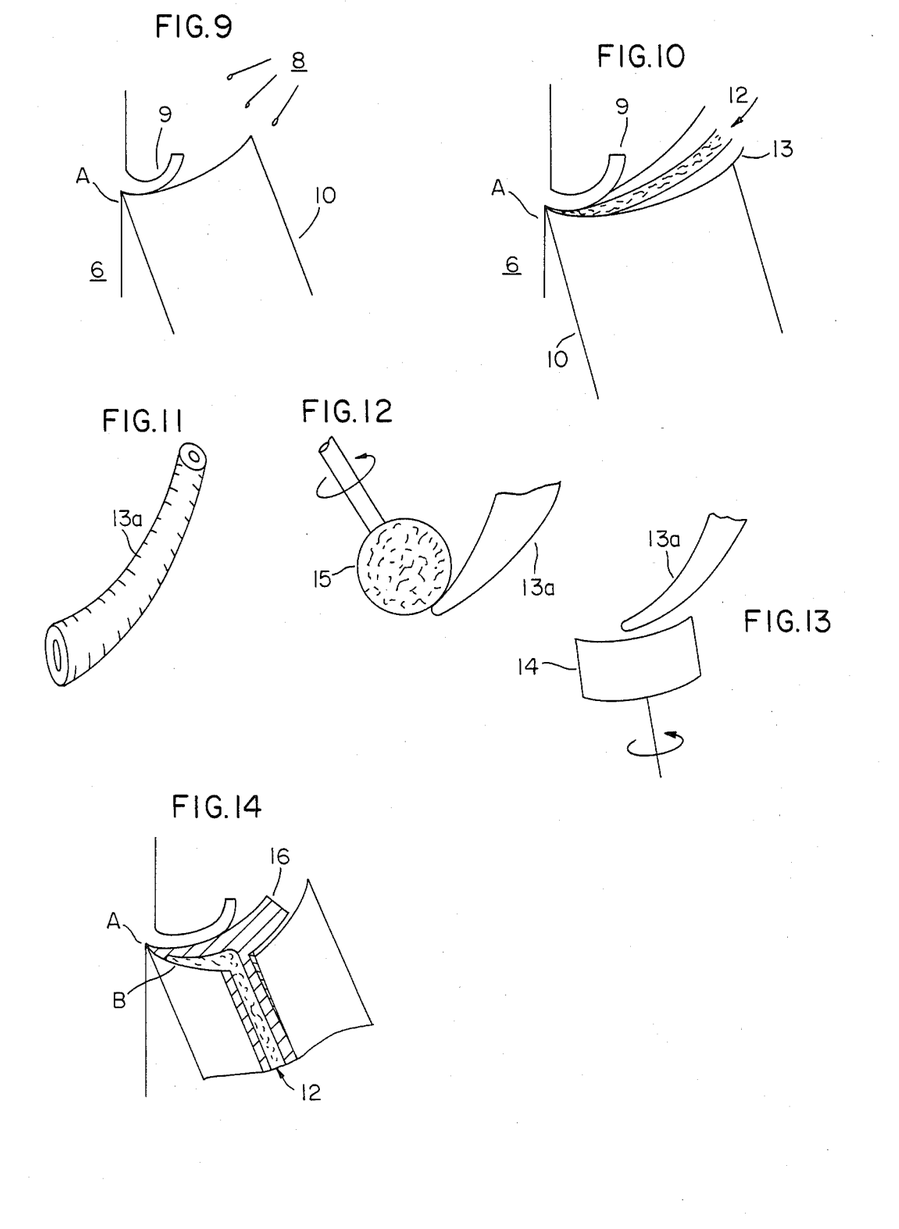

In FIG. 9, spray, 8, is directed onto the surface of the metal as in the conventional method. It may be seen that lubrication does not reach point A under the chip which is the most desireable point of application.

In FIG. 10 is shown one method of applying lubrication to point A which is an embodiment of this invention. Lubricant, 12, is passed through channel, 13, and emerges near the cutting edge so as to cover the cutting edge at point A, and the sliding interface between the toolbit and chip.

The channel, 13, is formed by feathering the edges of the flattened end of a tube so that the tube is contoured to conform to the concave surface of the tool bit. The feathered edge causes the chip to slide over the end of the tube as seen in FIG. 10. The steps taken to form the end of the channel are shown in FIGS. 11, 12, and 13.

In FIG. 11 is shown a tube, 13a, whose end has been flattened then bent.

In FIG. 13 is shown a concave grinder, 14, positioned to shape one end of the flattened tube, so that this side will conform to the concave surface of the tool bit as shown in FIG. 10.

In FIG. 12 is shown a second grinding operation on the flattened tube by a grinding ball, 15, which feathers the end of the tube so that the chip will slide over the edge.

In FIG. 14 is shown a second lubrication means in which a cap, 16, is provided which directs lubricant 12 flow to point A. The cap also lifts the chip so that lubricant flows into interface B.

Figures 15, 16, 17:
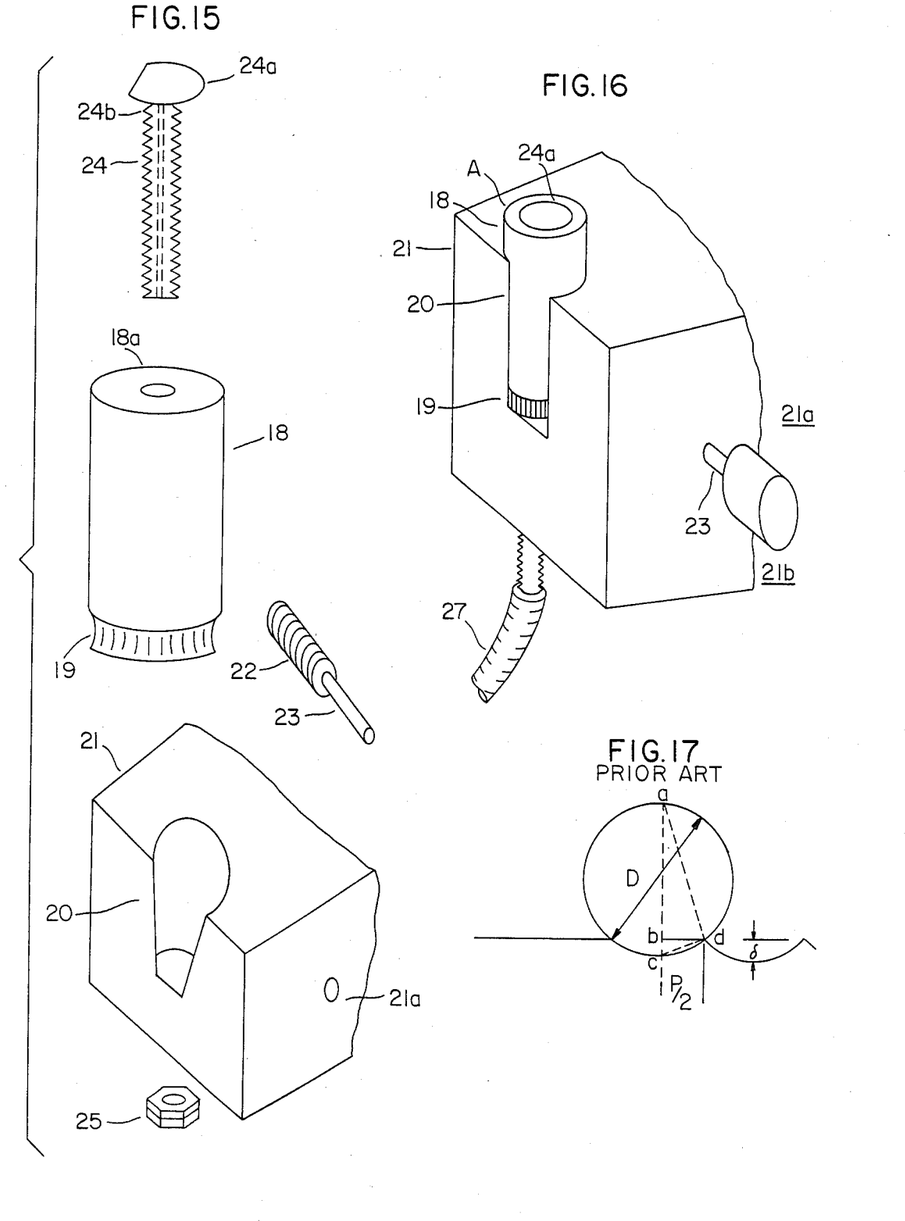
FIGS. 15 and 16 illustrate a construction of the holder which provides for easy rotation of the tool bit in very small increments or continuously to present an unused length of cutting edge.
FIG. 17 illustrates the computation of the surface roughness, $\delta$, as a function of the diameter of the cutting edge, D, and spacing between successive cuts, p, (pitch).

In FIG. 15 is shown an exploded view of an assembly to quickly permit incremental rotations of the tool bit to present an unused portion of the cutting edge together with the novel means of lubrication shown in FIG. 14.

The tool bit, 18, is shown with a worm gear, 19, attached to its end. The tool bit slides into a slot, 20, of tool block 21. A worm, 22, on stem, 23, passes through hole 21a, in tool block, 21, so as to engage worm gear, 19. Therefore, by rotating stem 23, the tool bit, 18, may be rotated so that a new cutting edge is presented. A hollow (externally) threaded stem, 24, with cap 24a, passes through the central hole, 18a, in tool bit, 18; and protrudes out of the block, 21, where it is secured by a pair of lock nuts, 25. If the lock nuts, 25, are not cinched too tightly against mounting block, 21, then the tool bit, 18, can be rotated while stem, 23, remains stationary. As seen in the assembly drawing of FIG. 16, lubricant can be pumped through the stem at 27 to the exit hole 24b, in FIG. 15. Circular cap, 24a, is seen to have a flat on one side so that lubricant emerges from under the cap and flows toward the cutting point.

It is obvious that the arrangement presented in FIGS. 16 and 15 is amenable to automatic operation simply by adding a suitable means to rotate the worm, 22, while simultaneously machining the metal. See motor, 21b, on shaft 23. It should be emphasized further that the assembly presented in FIG. 16 is only one means of a number of means for supporting the tool bit, 18, and additional means, obvious to those skilled in the art, are also embodiments of this invention.

In FIG. 17 is presented a diagram for computing roughness, $\delta$, of the surface resulting from machining with a tool bit of this invention whose diameter is D and the distance between the machined grooves (pitch) is p.

FIG. 17 shows that $$\delta = p^2/4D$$

a formula that has been verified by extensive experimentation. This formula is derived by noting in FIG. 17 that abd and dbc are similar triangles so that ab/bd=bd/bc.

A reasonable value of D is one inch. Assume the disk to be machined is rotating at 3,000 rev./min. and the toolbit travels 1 inch in ten sec. Then the pitch, p, will have a value of 0.002 inches. Using the formula above, $\delta$ is calculated to be 1 microinch. This is equivalent to an arithmetic average deviation from center line of $\frac{1}{2}$ microinch.

It is clear to one skilled in the art that the conventional use of a tool bit with a value of D equal to one inch is not feasible when trying to obtain a fine finish because the lubricant can not get under the broad chip.

Furthermore, it is well recognized that the manufacture of a tool bit with a large diameter using conventional techniques is expensive compared to the methods of this invention (plated core) discussed in the foregoing paragraphs.

In addition to the advantages of cutting plastics and metals discussed above, the advantages of machining other materials such as ceramics may also be recognized.

The process for machining ceramic is to form a bar that is only partially fired (the green state) in which condition it may be machined, and then, finally fired to its fully hard condition. Shrinkage results from the second firing, and although dimensional changes are allowed for, these dimensional changes impose a limit on achievable tolerance.

By machining the ceramic with tool bits in accordance with this invention, the problem of wear on the tool bits requiring frequent sharpening can be reduced so that even when the green state is closer to the final state to reduce shrinkage, the problems of excessive tool wear are alleviated.

Figure 18:
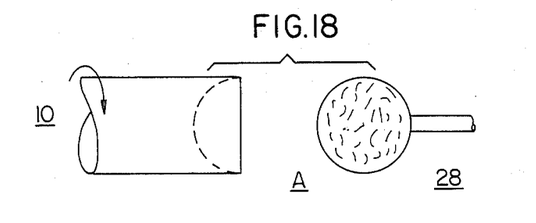
FIGS. 18 and 19 show two techniques for sharpening the tool bit.

FIG. 18 illustrates a method for sharpening the cutting edge. The tool bit (6,7, or 8) is secured in a lathe chuck and rotated. A grinding ball, 28, of appropriate radius is secured in the chuck located in the tail stock of a lathe. The ball, 28, is moved against the end of the rotating tool bit and sharpens the cutting edge.

Figure 19:
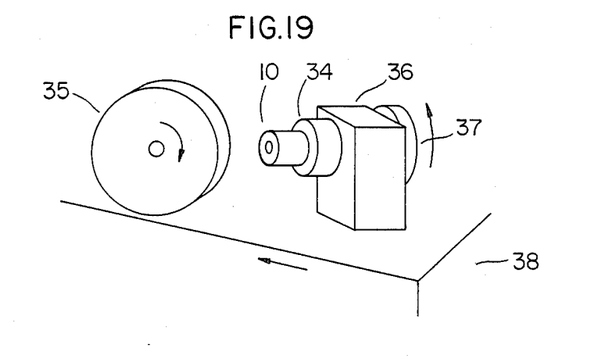

Another method of sharpening the tool bit is shown in FIG. 19. Here is shown the tool bit of this invention, 6,7 or 8, held in the collet, 34, of a rotating collet holder, 36. The handle, 37, for rotating the collet, 34, is shown. The slowly rotating tool bit is thereby moved against the edge of the grinding wheel, 35, so as to generate the concave shape, or to resharpen the cutting edge.

Figure 20:
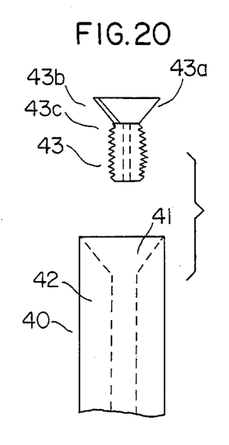
FIG. 20 shows a tool bit with a conical end.
Figure 21:
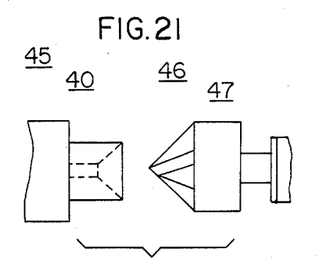
FIG. 21 is a perspective view showing mean for sharpening the tool bit as shown in FIG. 20.
Figure 22:
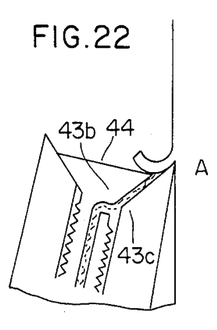
FIG. 22 is a sectional view of FIG. 20 showing the cutting action of the bit of FIG. 20.

A third method of maintaining a sharp cutting edge on the rod shaped tool bit is presented in connection with FIGS. 20, 21 and 22.

Referring to FIG. 20, the concave end, 41, of tool bit 40 is seen to be conical. The apex of the cone leads into the lubricating hole, 42.

This shape of tool bit end can be generated readily and the cutting edge maintained sharp as seen in FIG. 21 where there is shown a tool bit, 40, held in the chuck of a lathe, 45, while a countersink, 46, held in the chuck 47 of the tail stock of the lathe is brought against the end of the tool bit so as to generate the conical surface or to resharpen the cutting edge.

Referring again to FIG. 20, the lubricating stem, 43 has a cap, 43a, which is also conical in shape and has a flat hardened surface. The conical cap, 43a has a small flat, 43b, on its curved side, leading to the opening, 43c, in the side of the hollow lubricating stem, 43. A cross secion of the cutting action of this tool bit is shown in FIG. 22. It is seen that the hardened flat surface, 44, of the cap acts as a "chip breaker". The chip is seen to be lifted by the hardened surface of the cap, 44, so lubricant, 12, can flow out of opening, 43c, along flat, 43b, and between the underside of the chip and tool bit surface, to the cutting point, A.

The cylindrical shape of the tool bit of this invention is very economical since it is convenient to make the tool bit several inches long. Resharpening does not change the shape of the cutting edge as with the conventional conical shape. Therefore, it can be resharpened many times before it is too short to use.

Two examples of the shape of the surface of the cut-end of the toolbit have been presented to illustrate the general embodiments of the invention. The first shape was concave and discussed in connection with FIGS. 6, 7 and 8. The second shape was conical, discussed in connection with FIGS. 20, 21, 22. These shapes are representative of general shapes characterized by concentricity about the axis of the cylindrical toolbit and are all embodiments of the invention. For purposes of discussing this invention, these surfaces will be defined as depressed surfaces.

The capability to change automatically the cutting edge of the toolbit between or during cuts provides a means to automatically machining disks to a very fine finish as will now be discussed with reference to FIG. 23.

Figure 23:
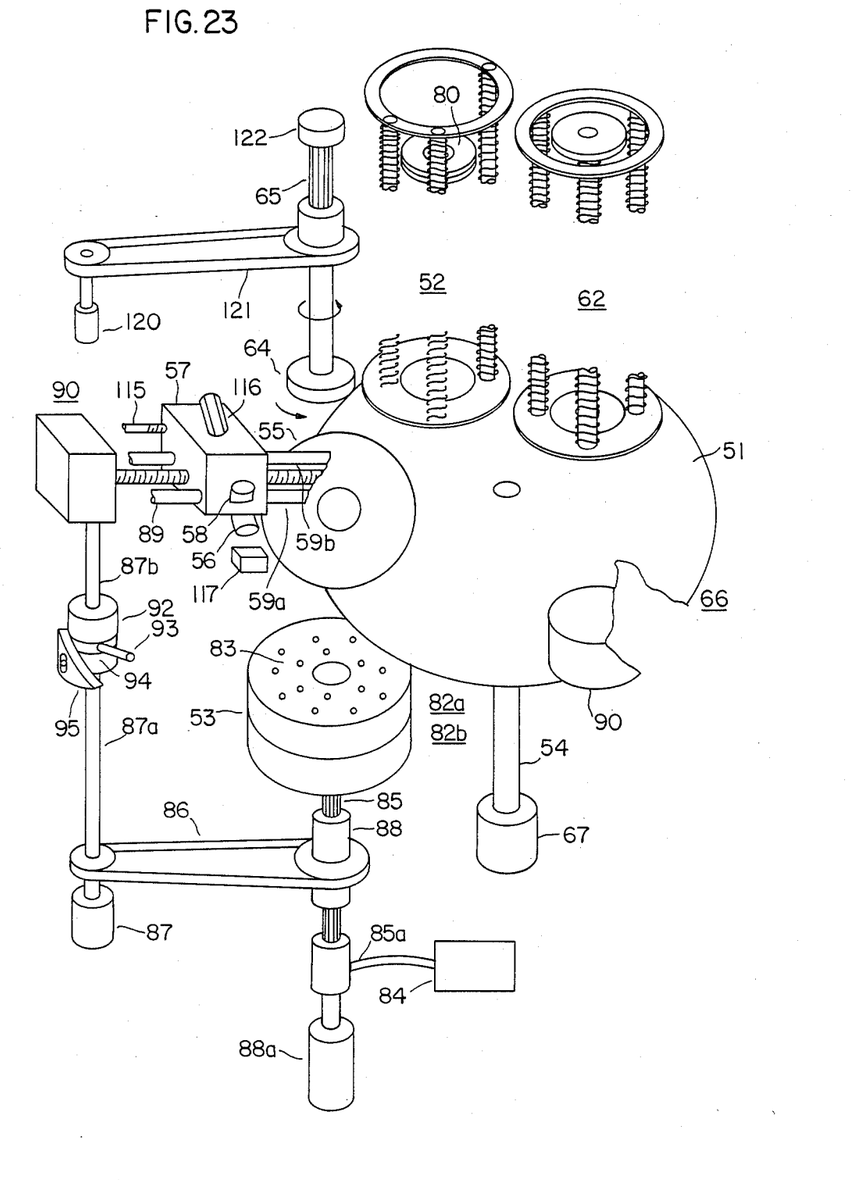
FIG. 23 shows an embodiment of the invention for manufacturing disks.
Figure 24:
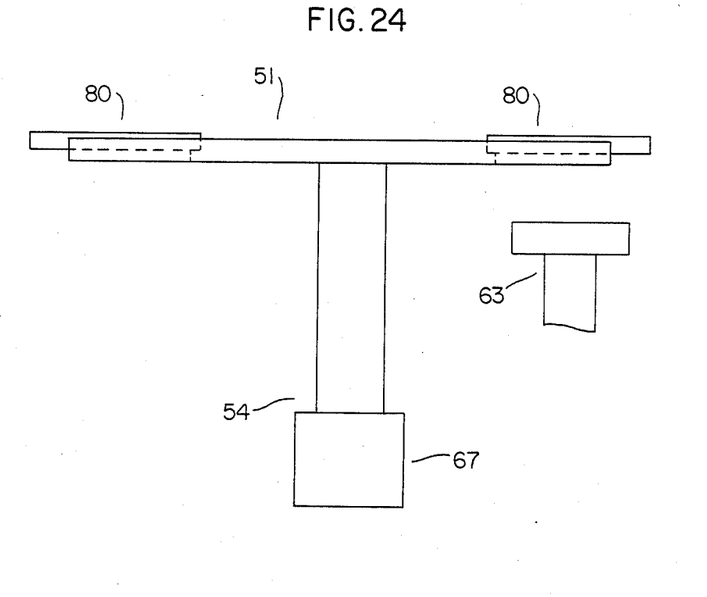
FIG. 24 shows the details of the turntable as shown in FIG. 23.

A turntable, 51 in FIG. 23, is shown in FIG. 24 as a plate supported on a shaft, 54. It can be rotated to four positions corresponding to the number of disk stations—feeder, 52, machining chuck, 53, washing, 66, and unloader, 62. For each position, there is a recessed hole (with shoulders) as shown in FIG. 24 in cross section so that disks, 80 can nest in each hole.

Referring to FIG. 23, a disk drops from the bottom end of the feeder, 52, in a manner to be described, and nests in the recessed hole of the plate of the turntable. Stepper motor, 67, rotates the plate, 51. The disk, 85 is brought onto the chuck by rotation of the turntable. Details of the chuck are shown in FIG. 2. The chuck is comprised of plate 82a fastened to plate 82b with holes leading from the face of the chuck leading to a vacuum pump, 84, through hollow shaft 85 connected to hose 85a. The shaft 85 is splined to hollow spindle 88 so that it can move axially by air cylinder 88a. The chuck is rotated by belt, 86, driven by motor, 87. Chuck plate 82b is skinned periodically to ensure flatness. It must be made of a material that will not scratch the disk surface. For this purpose, a rigid polyurethane foam has been found to be satisfactory and therefore is considered to be an embodiment of this invention. The foam, identified by its density, 2.8 pounds per cubic foot, may be purchased from the Cook Paint and Varnish Co., Kansas City, Mo.

When the disk is over the chuck, the chuck rises through the hole in the turntable and lifts the disk now secured to the chuck by vacuum. The chuck lifts the disk to the position where it can be machined by the toolbit. The toolbit assembly is mostly cut away in FIG. 23 but is shown in detail in FIG. 25. The toolbit 56 slides or turns in the block 57 when set screw 58 is loosened. It is turned to present an unused cutting edge by turning worm 115 engaged with spline 116 attached to the end of the toolbit as discussed in connection with FIG. 16. To set the position of the toolbit so as to cut the desired thickness of disk, the toolbit is positioned over stop 117 and set screw 58 loosened so that the cutting edge slides into contact with the stop. Then the set screw is tightened. This easy method ensures reproducibility in positioning the tool bit. Block 57 which holds the toolbit 56 slides on rails 59a and 59b, pushed or pulled by leadscrew, 89, powered by motor, 87 through speed reducer, 90 so as to move the toolbit forward and machine the disk.

When the disk is on the chuck and rotating, the toolbit is driven across the disk in two passes. On the first pass, from the outside to the inside of the disk, the tool bit cuts the surface of the disk and leaves a pattern of helical grooves. Then the direction of rotation of the disk is reversed and the tool bit moves from the center of the disk to the outside edge. On the second pass, the toolbit is displaced radially a distance of one half the pitch of the grooves machined in the first pass so that the center of the cutting edge is centered directly over the ridge of the grooves. Furthermore, the toolbit cutting edge will present a negative rake angle to the disk surface on the reverse pass so that the toolbit will be burnishing the 16 disk surface rather than cutting it.

Figure 27A:
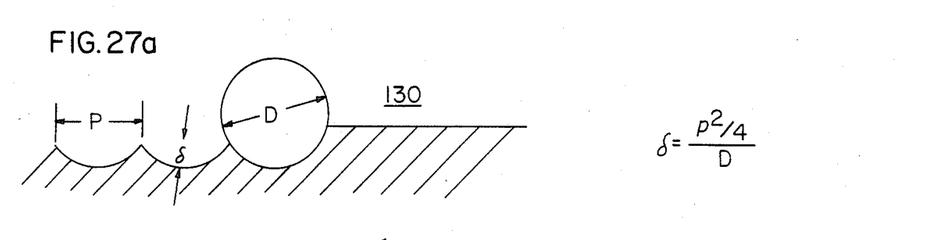
FIGS. 27a-27d shows the method of an apparatus for burnishing the tool bit of the invention.
Figure 27B:
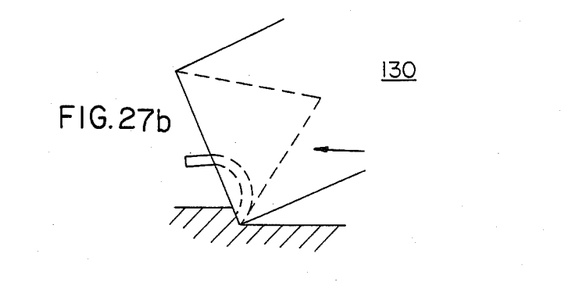
Figure 27C:
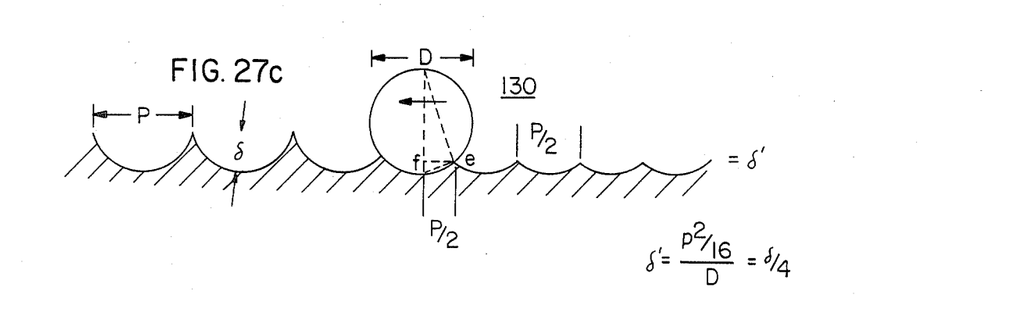

The cutting and burnishing actions of the two successive passes are illustrated in FIGS. 27a, 27b, 27c, and 27d. In FIG. 27a is shown a frontal cross sectional view of the toolbit 130 on the first pass the grooves. In FIG. 27b is shown a side view of the same toolbit. In FIG. 27c is shown toolbit 130 in frontal view, burnishing the ridges of the groove on the second pass. It is seen that in the second pass the toolbit burnishes off the ridge left by the first pass and leaves a ridge that is ¼ the height of the earlier ridge.

Figure 27D:
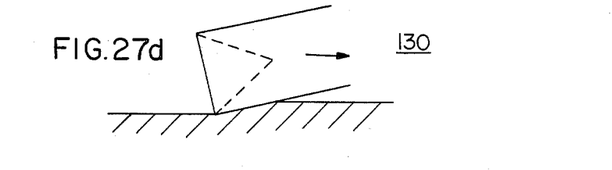

This reduction in the height of the ridge by a factor of four is confirmed by noting in FIG. 27d that the distance, ef, between the position of the ridge on the first pass and the smaller ridge formed by the second pass is ½ the pitch of machining, (i.e., the distance between grooves.) Therefore using the argument of similar triangles presented in the discussion of FIG. 17, $$d' = \frac{p^2/16}{D}$$

where d' is the height of the ridge on the second pass, D is the diameter of the toolbit, p is the pitch of machining.

There are a number of means by which the toolbit cutting edge can be centered over the ridges in the second pass and they are embodiments of this invention. One method will be presented with reference to FIG. 23. The shaft, coupling motor, 87, to speed reucer, 90, is seen to be comprised of two sections, 87a and 87b, joined by coupling 92. Coupling 92 is fixed rigidly to section 87a, but is attached to section 87b by sliding section 87b into a hole in the coupling and then securing a pin 93 in section 87b through a slot, 94, in coupling 92. Thus section 87b cannot be pulled out of the hole in the coupling but it can turn relative to the coupling. Thus, when the direction of rotation of section 87a is reversed, the rotation of 87b is delayed by an angular displacement proportional to the effective length of the slot. The effective length of the slot, 94 can be varied by means of wedge, 95.

For purposes of illustration, parameters will be assigned to the components. Motor, 87, turns 1200 rpm (rev per min) and drive the chuck, 83, at 2400 rpm through belt 86. The ratio of the speed reducer, 90, is 25. The pitch of the leadscrew, 89, which moves the toolbit, 106, of this invention, is 0.125 inches. Therefore, for every single rotation of the chuck, 53, the tool bit advances 0.0025 inches which is the pitch of machining. If the length of the slot 94, extends over half the circumference of the coupler, 92, then by using set screw 95 to set the effective length of the slot, the lag of the toolbit position during the burnishing pass and the cutting pass is adjustable between zero and one half the pitch distance as desired. Of course all of the connecting components-lead screw, motor coupling, speed reducer, have backlash which all add up to a constant value. The method of adding an adjustable backlash to the constant backlash provides the means for ensuring that the toolbit is properly positioned on the second pass.

The major advantage of the cutting/burnishing technique enabled by the novel toolbit configuration and lubrication means of this invention is to provide a finish with one tooling setup which is readily amenable to automation that had otherwise been achieved only by a series of costly independent steps.

While the disk is on the chuck, 53, and after the disk has been machined and the toolbit withdrawn, the disk can be polished by polishing pad, 64, shown in FIG. 23 on splined shaft 65, rotated by motor, 120, through belt 121. A cylinder, 122 moves pad, 64, so as to be brought into rubbing contact with the disk surface. It should be noted that only minimal polish is required using a very fine abrasive since the finish has already been reduced to the microinch range by the machining/burnishing step.

After the disk has been machined and polished, the chuck drops so that the disk is transferred back onto the turntable.

It should be noted that the novel maneuver of moving the chuck to and from the toolbit which is an embodiment of this invention presents several advantages over the conventional lathe design wherein the toolbit is moved to and from the chuck.

One advantage is that the expense, complexity and precision required to build the two rails to carry the cross feed mechanismand the requirement to accurately align the rails with the axis of the chuck, as practiced in the manufacture of conventional lathes is replaced by a shaft, sliding in a sleeve which can easily be ground to close tolerances.

A second advantage is that it permits the use of a simple turntable wherein the chuck simply passes through a hole in the turntable to pickup or unload the disk. This replaces a much more complicated device that would be required for a conventional lathe such as mechanical fingers used according to prior art.

Figure 25:
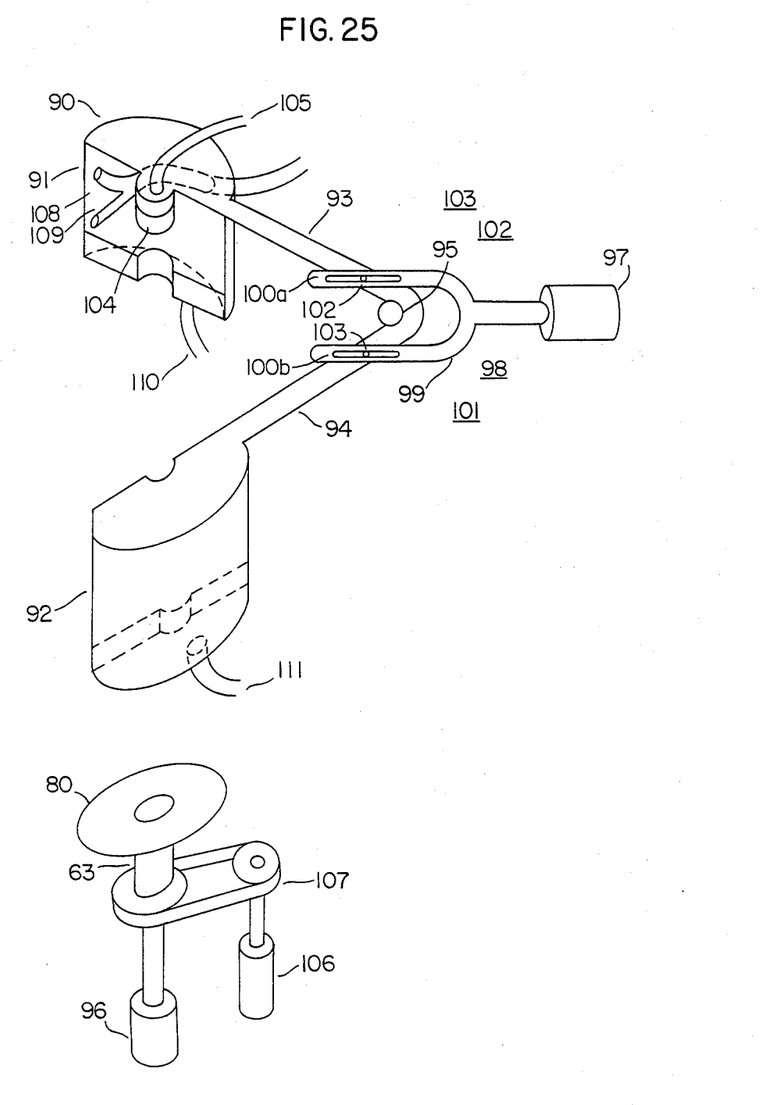
FIG. 25 shows the details of the washer apparatus.

After the machining and polishing step, the turntable, 51, rotates the disk to position 66 in FIG. 23. This is the wash station. The wash apparatus, 90, is seen as a closed shell, 90, partially cut away in FIG. 23. Referring to FIG. 25 for more detail, the shell, 90, is shown comprised of two half chambers, 91 and 92, each supported on arms 93 and 94, that are hinged at 95.

When disk, 80, is lifted by piston, 63, powered by pneumatic cylinder, 96, to the appropriate height, the two half chambers come together so as to enclose the disk. The closing of the chamber is powered by pneumatic cylinder, 97. The connecting link between the cylinder, 97, and arms 93 and 94, is seen to be a fork, 99, with slots, 100a and 100b, through which protrude pins, 102 and 103, attached to arms 93 and 94. After the chamber has closed, a cap, 104, actuated through air hose, 105, presses down on the disk so as to secure the disk on piston, 63. Then the disk is rotated, driven by motor, 106, through belt, 107. As the disk is rotating, a jets of water, impinge on both sides of the disk from jets, 108 and 109, for about six seconds seconds. Then the water is turned off and the disk continues to spin for about 20 seconds in order to dry. Water that runs off the disk collects in the bottom of the chambers and is drained off through drains, 110 and 111.

After the disk has been washed and dried, the chamber opens and piston, 63, drops down, leaving the disk on the turntable.

The turn table rotates bringing the disk under the unloader, 62, in FIG. 23.

Figure 26:
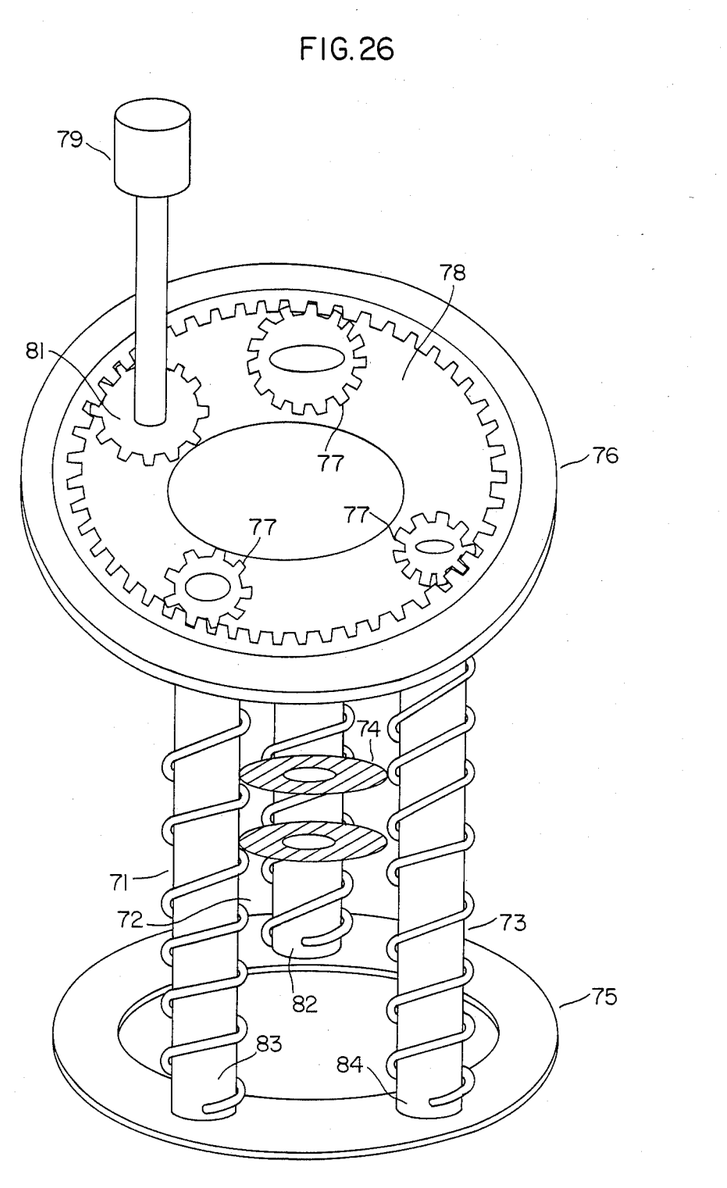
FIG. 26 shows details of the feeder and unloader as shown in FIG. 23.

Further details of the feeder, 52, and unloader, 62, may be examined by reference to FIG. 26. The feeder, 52, is identical to the loader, 62, as will be discussed further. The feeder is seen to have three parrallel threaded rods, 71, 72, 73, spaced so that a disk, 74, can rest on the threads, as shown. When the three rods are rotated one revolution, simultaneously, the disk advances a distance of one pitch of the threads.

The three rods are supported by a bottom plate, 75, and a top plate, 76. The threaded rods, 71,72,73, protrude through the top of plate 76, and have gears, 77, fixed to their ends. An internal gear, 78, drives the three gears, 71,72,73, simultaneously. A stepper motor, 79, which turns in increments of one revolution, drives the internal gear, 78, through gear 81.

If the internal gear turns in the feeder direction, discs may be loaded in at the top, one disc per revolution of the stepper motor, 79.

If the internal gear is turned in the unloader direction, then, when a disc is lifted int contact with the bottom threads, by means of a piston, 63, in FIG. 24, then the disc engages the bottom threads, 82,83,84, and advances a distance of one pitch per revolution until it is removed from the top of the unloader.

The feeder and unloader discussed above presents novel advantage of being able to feed discs in one end and out the other. The design is furthermore adapted for loading and unloading the turntable of this invention. Thus it can be loaded or unloaded at an appropriate period during the manufacturing cycle, without interrupting production.

The operation described above machines and polishes only one side of the disk. When the unloader is full of disks, polished on only one side, it may be inverted and used as a feeder in order to machine and polish the other sides of the discs, by feedig the discs back onto the turntable.

The interdependence of each of the novel concepts of this apparatus may be outlined thusly: a feeder that can be loaded at one end and discharged at the other with special adaptation to the transfer table; a chuck that moves axially so that it is especially adaptable to removing disks from the turn table and, furthermore is especially adaptable to positioning with respect to a toolbit, thereby simplifying the requirement to precisely position the toolbit relative to the chuck; a toolbit shape that is amenable to frequent automatic sharpening and whose shape, together with the unique coupling between the toolbit drive and the chuck drive, provides for a cutting and burnishing action on successive passes of the toolbit to give a finish that requires little or no subsequent polishing; a washing station whose rising chuck feature is uniquely adapted to the simple design of the turntable; a piston action which adapts the simple design of the turntable to the unloader.

All of these interdependencies combine to provide the apparatus of this invention for the purpose of manufacturing disks economically and with fine finish.

I claim:

1. A device for machining materials said device including a tool bit comprising a circular cylindrical rod having an external cylindrical surface, a first end with an internal first surface, a circular cutting edge formed at the intersection of said external surface and said internal first surface, a second end with a second surface, a hole extending longitudinally from said second surface to said first surface and means for supplying lubricating fluid to said cutting edge, said means including an elongated stem located in said hole, said stem having first and second stem ends connected by a bore, said first stem end having a round side and cap located within a recess formed by the internal surface formed by the internal surface of said rod, an opening in said round side adjacent said cap, said opening communicating with said bore, and said second stem end protruding from said hole at the second surface of said rod, whereby lubricating fluid may be supplied to said bore at said first stem end to lubricate material being machined at said cutting edge.

2. A device as in claim 1 which further comprises:
   a block for supporting said round rod having a cylindrical hole so that said round rod may slideably fit into said cylindrical hole;
   a worm gear concentric with and attached to said round rod at said second end and having a hole through which said second end of said stem protrudes;
   a worm mounted on said block and engaged with said worm gear;
   so that by turning said worm, said worm gear and rod are turned in order to position unused portions of said cutting edge for machining said material.

* * * * *